(12) United States Patent
Gier et al.

(10) Patent No.: US 11,780,211 B2
(45) Date of Patent: Oct. 10, 2023

(54) COLORED THERMOPLASTIC INTERMEDIATE LAYER WITH WEDGE-SHAPED CROSS-SECTION

(71) Applicant: SAINT-GOBAIN GLASS FRANCE, Courbevoie (FR)

(72) Inventors: Stephan Gier, Bous (DE); Andrea Willms, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/801,682

(22) PCT Filed: Mar. 25, 2021

(86) PCT No.: PCT/EP2021/057675
§ 371 (c)(1),
(2) Date: Aug. 23, 2022

(87) PCT Pub. No.: WO2021/204550
PCT Pub. Date: Oct. 14, 2021

(65) Prior Publication Data
US 2023/0131635 A1  Apr. 27, 2023

(30) Foreign Application Priority Data
Apr. 7, 2020 (EP) .................................... 20168474

(51) Int. Cl.
*B32B 17/10* (2006.01)
*B32B 3/26* (2006.01)
(Continued)

(52) U.S. Cl.
CPC ........ *B32B 17/10568* (2013.01); *B32B 3/263* (2013.01); *B32B 17/10036* (2013.01);
(Continued)

(58) Field of Classification Search
CPC .............. B32B 3/263; B32B 17/10568; B32B 17/10036; B32B 17/10633;
(Continued)

(56) References Cited

U.S. PATENT DOCUMENTS

| 3,715,420 A | 2/1973 | Kiyono et al. |
| 3,799,718 A | 3/1974 | Kiyono et al. |

(Continued)

FOREIGN PATENT DOCUMENTS

| DE | 195 35 053 A1 | 4/1996 |
| DE | 196 11 483 A1 | 10/1997 |

(Continued)

OTHER PUBLICATIONS

International Search Report as issued in International Patent Application No. PCT/EP2021/057675, dated Jun. 14, 2021.

(Continued)

*Primary Examiner* — Megha M Gaitonde
(74) *Attorney, Agent, or Firm* — Pillsbury Winthrop Shaw Pittman LLP

(57) ABSTRACT

A colored thermoplastic intermediate layer with a width, a height, and a wedge-shaped cross-section with a thicker first end and a thinner second end, at least comprising a first colored thermoplastic layer with a width, a height, and a wedge-shaped cross-section with a thicker first end and a thinner second end, wherein the width and the height of the colored thermoplastic intermediate layer equal the width and the height of the first colored thermoplastic layer, the first colored thermoplastic layer has a dye, the dye concentration in the first colored thermoplastic layer increases from its thicker first end to its thinner second end, the light transmittance through the first colored thermoplastic layer is constant over its entire width and its entire height, and the light transmittance through the colored thermoplastic inter- (Continued)

mediate layer is constant over its entire width and its entire height.

20 Claims, 4 Drawing Sheets

(51) Int. Cl.
  *B32B 33/00* (2006.01)
  *B32B 37/22* (2006.01)
(52) U.S. Cl.
  CPC .... *B32B 17/1077* (2013.01); *B32B 17/10633* (2013.01); *B32B 17/10651* (2013.01); *B32B 17/10678* (2013.01); *B32B 17/10788* (2013.01); *B32B 17/10935* (2013.01); *B32B 33/00* (2013.01); *B32B 37/223* (2013.01); B32B 2250/03 (2013.01); B32B 2250/40 (2013.01); *B32B 2307/102* (2013.01); *B32B 2307/4026* (2013.01); *B32B 2315/085* (2013.01); *B32B 2329/06* (2013.01); *B32B 2331/04* (2013.01); *B32B 2375/00* (2013.01); *B32B 2457/20* (2013.01); *B32B 2605/006* (2013.01)

(58) Field of Classification Search
  CPC ........ B32B 17/10651; B32B 17/10678; B32B 17/1077; B32B 17/10788; B32B 17/10935; B32B 17/10174; B32B 17/10357; B32B 17/10761; B32B 17/06; B32B 33/00; B32B 37/223; B32B 2250/03; B32B 2250/40; B32B 2307/102; B32B 2307/4026; B32B 2315/085; B32B 2329/06; B32B 2331/04; B32B 2375/00; B32B 2457/20; B32B 2605/006; B32B 2605/08; B32B 27/306; B32B 27/06; B32B 27/08; B32B 27/20; B32B 27/308; B32B 27/365; B32B 27/40; G02B 27/01; G02B 27/0101; B60J 1/00; B60J 1/001; B60J 1/02; Y10T 428/24479; Y10T 428/24612; Y10T 428/24942; Y10T 428/2495; Y10T 428/24992

USPC ................ 428/156, 172, 212, 213, 214, 218
See application file for complete search history.

(56) References Cited

U.S. PATENT DOCUMENTS

| | | |
|---|---|---|
| 4,562,023 A | 12/1985 | Pabst et al. |
| 5,455,103 A | 10/1995 | Hoagland et al. |
| 6,863,956 B1 | 3/2005 | Nakajima et al. |
| 7,883,761 B2 | 2/2011 | Bourcier et al. |
| 2016/0341960 A1 | 11/2016 | Miyai |
| 2018/0117883 A1 | 5/2018 | Olson et al. |
| 2021/0213711 A1* | 7/2021 | Nakayama .............. B32B 5/145 |

FOREIGN PATENT DOCUMENTS

| | | |
|---|---|---|
| DE | 699 36 737 T2 | 4/2008 |
| DE | 10 2012 211 729 A1 | 1/2014 |
| EP | 0 420 228 B1 | 3/1995 |
| EP | 1 800 855 A1 | 6/2007 |
| EP | 2 017 237 A1 | 1/2009 |
| EP | 3 466 675 A1 | 4/2019 |
| WO | WO 2006/101960 A1 | 9/2006 |
| WO | WO 2015/079158 A1 | 6/2015 |
| WO | WO 2015/086233 A1 | 6/2015 |
| WO | WO 2015/086234 A1 | 6/2015 |
| WO | WO 2018/081570 A1 | 5/2018 |
| WO | WO 2018/115768 A1 | 6/2018 |
| WO | WO 2019/189741 A1 | 10/2019 |
| WO | WO 2020/007610 A1 | 1/2020 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=1079689&change_language=en>. (English abstract on p. 5 of document).

* cited by examiner

COLORED THERMOPLASTIC INTERMEDIATE LAYER WITH WEDGE-SHAPED CROSS-SECTION

CROSS-REFERENCE TO RELATED APPLICATIONS

This application is the U.S. National Stage of PCT/EP2021/057675, filed Mar. 25, 2021, which in turn claims priority to European patent application number 20168474.3 filed Apr. 7, 2020. The content of these applications are incorporated herein by reference in their entireties.

The invention relates to a colored thermoplastic intermediate layer with a wedge-shaped cross-section, a composite pane having such an intermediate layer, a method for producing the same, and use of the same.

Composite panes are currently used in many places, in particular in the vehicle sector. Here, the term "vehicle" includes, among other things, road vehicles, aircraft, watercraft, agricultural machinery, or even work equipment.

Composite panes are also used in other sectors. These include, for example, architectural glazings or information displays, e.g., in museums or as advertising displays.

A composite pane generally has two panes that are laminated onto an intermediate layer. The panes themselves can be curved and are usually of constant thickness. The intermediate layer usually comprises a thermoplastic material, preferably polyvinyl butyral (PVB), of a predefined thickness, e.g., 0.76 mm.

Since the composite panes are often inclined relative to a viewer, double images occur. These double images are caused by the fact that incident light usually does not pass completely through both panes, but, instead, at least part of the light is reflected and passes through the second pane only after that. These double images are, in particular, noticeable in the darkness, in particular with strongly radiating light sources such as, for instance, the headlights of an oncoming vehicle. These double images are extremely distracting and are a safety issue.

Often, composite panes are also used as a head-up display (HUD) for displaying information. In that case, an image is projected by means of a projection apparatus onto the composite glass panes to insert information into the field of vision of the viewer. In the vehicle sector, the projection apparatus is, for example, arranged on the dashboard such that the projected image is reflected on the nearest glass surface of the composite glass pane inclined in the direction of the viewer (cf., e.g., EP 0 420 228 B1 or DE 10 2012 211 729 A1). Here again, however, part of the light enters the composite glass panes and is then reflected, for example, on the outside boundary layer of the glass surface farther out from the point of view of the viewer and subsequently exits the composite glass pane with an offset. Here, as well, a similar effect occurs, the effect of ghost images relative to the image to be displayed.

A purely conventional compensation of ghost images results in the fact that an overcompensation for double images in transmittance is observed. This results in the fact that the respective viewer is confused or, in the worst case, receives misinformation. This problem can be solved by no longer arranging the surfaces of the panes parallel to one another, but, instead, at a fixed angle. This is accomplished, for example, in that the intermediate layer and/or at least one of the panes is wedge-shaped with a continuously linearly and/or nonlinearly increasing and/or decreasing thickness. In the vehicle sector, the thickness is typically varied such that the smallest thickness is provided at the lower end of the composite glass pane toward the engine compartment, whereas the thickness increases toward the roof. Thus, the thickness of the intermediate layer with a wedge-shaped cross-section increases from the lower end to the upper end of the intermediate layer.

Composite panes of this type with a wedge-shaped intermediate layer and the optical principles on which they are based are known per se and are described, for example, in the international patent applications WO 2015/086234 A1 and WO 2015/086233 A1 or the German published patent applications DE 196 11 483 A1 and DE 195 35 053 A1.

In modern means of transportation such as trains or motor vehicles, acoustic comfort is increasingly important. To improve the acoustically damping properties of a composite pane, a multilayer intermediate layer including an acoustically damping layer arranged between two layers is commonly laminated between the two panes.

WO 2018/081570 A1, US 2016/0341960 A1, and EP 2 017 237 A1 disclose wedge-shaped multilayer intermediate layers that include a layer of constant thickness and a layer with a wedge-shaped cross-section, wherein the layer of constant thickness includes an acoustically damping layer arranged between two protective layers.

EP 3 466 675 A1 discloses a composite pane with an intermediate layer with a wedge-shaped cross-section, wherein the intermediate layer contains pigments as infrared-radiation-absorbing materials.

US 2018/117883 A1 discloses a wedge-shaped multilayer intermediate layer comprising a layer with constant thickness and a layer with a wedge-shaped cross-section, wherein the layer with constant thickness comprises an acoustically damping layer arranged between two protective layers and wherein the individual layers of the wedge-shaped multilayer intermediate layer can have pigments.

WO 2019/189741 A1 discloses a wedge-shaped multilayer intermediate layer comprising an infrared-reflecting layer, a first resin layer, and a second resin layer, wherein the first resin layer is arranged on a first surface side of the infrared-reflecting layer, the second resin layer is arranged on a second surface side opposite the first surface of the infrared-reflecting layer, and wherein at least one of the first resin layer and the second resin layer has a wedge angle of 0.1 mrad or more, and at least one of the first resin layer and the second resin layer contains a colorant.

In colored intermediate layers with a wedge-shaped cross-section, wherein the dye concentration in the intermediate layer is constant over their width, height, and thickness, there is the problem that, due to the wedge-shaped cross-section, under the non-constant thickness associated therewith, the light transmittance through the intermediate layer is not constant over its area, i.e., over the entire height and the entire width. Thus, the light transmittance through the intermediate layer is higher at the thinner end of the intermediate layer and the color is brighter than at the thicker end of the intermediate layer. With increasing thickness, the light transmittance through the intermediate layer decreases and the color darkens.

The object of the present invention is to provide a colored thermoplastic intermediate layer that has a wedge-shaped cross-section and with which the light transmittance is constant over the entire width and height of the intermediate layer, the color is substantially constant over the entire height and width and/or which is easy to manufacture.

The object of the present invention is accomplished according to the invention by a colored thermoplastic intermediate layer in accordance with claim 1 and a method in accordance with claim 13. The invention also relates to a composite pane, a projection arrangement, and the use of the colored thermoplastic intermediate layer in accordance with the coordinate claims. Preferred embodiments emerge from the dependent claims.

The invention relates to a colored thermoplastic intermediate layer with a width, a height, and a wedge-shaped cross-section with a thicker first end and a thinner second end, at least comprising a first colored thermoplastic layer with a width, a height, and a wedge-shaped cross-section with a thicker first end and a thinner second end. The increase in thickness from the second end to the first end can be continuously linear or non-linear.

According to the invention, the width and height of the colored thermoplastic intermediate layer equal the width and height of the first colored thermoplastic layer.

The area occupied by the first colored thermoplastic layer thus equals the area of the colored thermoplastic intermediate layer. Thus, the first colored thermoplastic layer is arranged not only in a partial area of the colored thermoplastic intermediate layer, but over the entire area. Consequently, if the colored thermoplastic intermediate layer comprises only the first colored thermoplastic layer, the thickness profile of the colored thermoplastic intermediate layer also equals the thickness profile of the first colored thermoplastic layer. If the colored thermoplastic intermediate layer comprises, in addition to the first colored thermoplastic layer, further layers such as an acoustically damping layer having a substantially constant thickness and a width and a height as well as a second colored thermoplastic layer with a width, a height, and a wedge-shaped cross-section with a thicker first end and a thinner second end, the thickness profile of the colored thermoplastic intermediate layer is composed of the thickness profiles of the first colored thermoplastic layer, the acoustically damping layer, and the second colored thermoplastic layer. Thus, the thickness of the colored thermoplastic intermediate layer at a point equals in these embodiments the sum of the thicknesses of the first colored thermoplastic layer, the acoustically damping layer, and the second colored thermoplastic layer at that point.

The first colored thermoplastic layer has a dye. The dye can, for example, be an ink or a color pigment. The advantage in particular, of organic inks compared to, in particular, inorganic pigments is that they are more readily distributable. However, organic inks are not as stable as inorganic pigments and age more quickly. However, inorganic pigments agglomerate more than organic inks. Suitable inks or color pigments for the respective applications are known to the person skilled in the art such that this is not discussed in detail in the following.

According to the invention, the light transmittance through the first colored thermoplastic layer is constant over its entire width and its entire height. Consequently, the light transmittance through the colored thermoplastic intermediate layer is also constant over the entire width and the entire height, i.e., over its entire area.

Despite a wedge-shaped cross-section, constant light transmittance is achieved over the entire width and the entire height by increasing the dye concentration in the first colored thermoplastic layer from the thicker first end of the first colored thermoplastic layer to its thinner second end.

The ratio of the dye concentrations at positions in the layer with different thickness that is required to achieve constant light transmittance at both positions can preferably be calculated as follows:

$$\frac{c_1}{c_2} = \left(1 - \frac{\Delta x}{t_1} \cdot \tan\alpha\right) \cdot \frac{\varepsilon_2}{\varepsilon_1}$$

Where:
$t_1$: thickness at position 1
$t_2$: thickness at position 2
$c_1$: concentration at position 1
$c_2$: concentration at position 2
$\varepsilon_1$: extinction coefficient at position 1
$\varepsilon_2$: extinction coefficient at position 2
$\alpha$: wedge angle
$\Delta x$: distance between position 1 and position 2

The colored thermoplastic intermediate layer can have a wedge angle in the range from 0.1 mrad to 1.0 mrad, preferably 0.3 mrad to 0.6 mrad, for example, 0.5 mrad.

The thickness of the colored thermoplastic intermediate layer at its thinner second end is preferably between 0.3 mm and 1.0 mm, particularly preferably between 0.6 mm and 0.9 mm, for example, 0.76 mm.

The thickness of the first colored thermoplastic layer at its thinner second end is preferably between 0.3 mm and 1.0 mm, particularly preferably between 0.3 mm and 0.9 mm, for example, 0.38 mm or 0.76 mm, with the proviso that the thickness at the thinner second end is less than the thickness at the thicker first end.

In a preferred embodiment, the first colored thermoplastic layer contains a dye and at least polyvinyl butyral (PVB), ethylene vinyl acetate (EVA), polyurethane (PU), or mixtures or copolymers or derivatives thereof. Particularly preferably, the first colored thermoplastic layer contains a dye and preferably polyvinyl butyral (PVB), most particularly preferably a dye, polyvinyl butyral (PVB), and plasticizer.

In a particularly preferred embodiment of the multilayer thermoplastic intermediate layer according to the invention, the color of the multilayer colored thermoplastic intermediate layer is substantially constant over its entire area, i.e., over its entire width and over its entire height.

Color differences are usually calculated in the CIELab color model as the Euclidean distance of the L*a*b* values of two colors measured at different measuring points.

In the context of this application, a substantially constant color means that the color distance as required by the automotive industry, i.e., the Euclidean distance taking into account the sensitivity of the eye is less than 0.5, preferably less than 0.2.

$$\Delta E' = \sqrt{\left(\frac{\Delta L^*}{2}\right)^2 + (\Delta a^*)^2 + (\Delta b^*)^2}$$

Where
$\Delta L^* = L_1^* - L_2^*$
$\Delta a^* = a_1^* - a_2^*$
$\Delta b^* = b_1^* - b_2^*$
$L_1^*$ = luminance at a first position
$L_2^*$ = luminance at a second position
$a_1^*$ = value for the green or red component of a color at a first position
$a_2^*$ = value for the green or red component of a color at a second position
$b_1^*$ = value for the blue or yellow component of a color at a first position
$b_2^*$ = value for the blue or yellow component of a color at a second position ΔE'=Euclidean distance of the L*a*b* values of two colors taking into account the sensitivity of the eye For example, the values can be L*=85, a*=−0.5, and b*=−0.5.

The colored thermoplastic intermediate layer can optionally additionally have a colored band of different color intensity, a so-called shaded band as described, for example, in U.S. Pat. No. 4,562,023. It goes without saying that in the region of such an additional colored band, the light transmittance and the color are not the same as in the rest of the colored multilayer intermediate layer.

The colored thermoplastic intermediate layer can be formed by a single layer or by more than one layer.

In the embodiment in which the colored thermoplastic intermediate layer is formed by a single layer, the colored thermoplastic intermediate layer comprises a first colored thermoplastic layer with a width, a height, and a wedge-shaped cross-section with a thicker first end and a thinner second end, wherein the width and the height of the colored thermoplastic intermediate layer equal the width and the height of the first colored thermoplastic layer, the first colored thermoplastic layer has a dye, the dye concentration in the first colored thermoplastic layer increases from its thicker first end to its thinner second end, the light transmittance through the first colored thermoplastic layer is constant over its entire width and its entire height, and the light transmittance through the colored thermoplastic intermediate layer is constant over its entire width and its entire height.

It goes without saying that in the embodiment in which the colored thermoplastic intermediate layer is formed by only a first colored thermoplastic layer, the thickness profile of the colored thermoplastic intermediate layer equals the thickness profile of the first colored thermoplastic layer.

In one embodiment, the colored thermoplastic intermediate layer is a functional intermediate layer with acoustically damping properties. Such an intermediate layer typically consists of at least three plies, with the middle ply having lower stiffness than the outer plies surrounding it, for example, as a result of a higher plasticizer content.

In the embodiment as a functional intermediate layer with acoustically damping properties, the colored thermoplastic intermediate layer also includes, in addition to a first colored thermoplastic layer, an acoustically damping layer having a substantially constant thickness and a width and a height as well as a second colored thermoplastic layer with a width, a height, and a wedge-shaped cross-section with a thicker first end and a thinner second end.

In the present application, the term "substantially constant thickness" of a layer means that the thickness of the layer is constant over the width and height in the context of normal manufacturing tolerances. Preferably, this means that the thickness varies by not more than 3%, preferably by not more than 2%, particularly preferably by not more than 1%.

The width and the height of the acoustically damping layer and the width and the height of the second colored thermoplastic layer equal the width and the height of the colored thermoplastic intermediate layer and the width and the height of the first colored thermoplastic layer. The acoustically damping layer is arranged between the first colored thermoplastic layer and the second colored thermoplastic layer. The three layers, i.e., the first colored thermoplastic layer, the acoustically damping layer, and the second colored thermoplastic layer, are arranged one above another in a planar manner in the order mentioned. The first colored thermoplastic layer has a dye, with the dye concentration increasing from the thicker first end of the first colored thermoplastic layer to its thinner end. The light transmittance through the first colored thermoplastic layer is constant over its entire width and its entire height. The second colored thermoplastic layer has a dye, with the dye concentration increasing from the thicker first end of the second colored thermoplastic layer to its thinner end. The light transmittance through the second colored thermoplastic layer is constant over its entire width and its entire height. Consequently, the light transmittance through the colored thermoplastic intermediate layer is also constant over the entire width and the entire height, i.e., over its entire area.

The ratio of the dye concentrations at positions in the layer with different thickness that is required to achieve constant light transmittance at both positions can be calculated for the first colored thermoplastic layer and the second colored thermoplastic layer, preferably as indicated above.

It goes without saying that in the embodiment as a functional intermediate layer with acoustically damping properties, the thickness profile of the colored thermoplastic intermediate layer equals the sum of the thickness profiles of the first colored thermoplastic layer, the acoustically damping layer, and the second colored thermoplastic layer.

In one embodiment, the acoustically damping layer is colorless. In an alternative embodiment, the acoustically damping layer is colored with a dye.

As described above, the dye can be an ink or color pigments.

Preferably, the first colored thermoplastic layer and the second colored thermoplastic layer are the same color; and, if the acoustically damping layer is colored, it is also the same color. However, it is also possible for the first colored thermoplastic layer and the second colored thermoplastic layer to be different colors, and thus for the color of the thermoplastic intermediate layer according to the invention in these embodiments to be composed of the colors of the two layers, or in the case of a colored acoustically damping layer, of the colors of the three layers.

In a preferred embodiment, the second colored thermoplastic layer contains a dye and at least polyvinyl butyral (PVB), ethylene vinyl acetate (EVA), polyurethane (PU), or mixtures or copolymers or derivatives thereof. Particularly preferably, the second colored thermoplastic layer contains a dye and preferably polyvinyl butyral (PVB), most particularly preferably a dye, polyvinyl butyral (PVB), and plasticizer.

The thickness of the second colored thermoplastic layer at its thinner second end is preferably between 0.3 mm and 1.0 mm, particularly preferably between 0.3 mm and 0.9 mm, for example, 0.38 mm or 0.76 mm, with the proviso that the thickness at the thinner second end is less than the thickness at the thicker first end.

The acoustically damping layer is preferably thinner than 300 μm (microns). The thickness of the acoustically damping layer is in particular 70 μm to 130 μm, for example, 100 μm.

The acoustically damping layer can contain at least polyvinyl butyral (PVB), ethylene vinyl acetate (EVA), polyurethane (PU), acrylates, or mixtures or copolymers or derivatives thereof and plasticizer, preferably polyvinyl butyral (PVB) and plasticizer. In the embodiments in which the acoustically damping layer is colored with a dye, the acoustically damping layer additionally contains a dye.

The second colored thermoplastic layer preferably has a wedge angle in the range from 0.05 mrad to 0.5 mrad, particularly preferably 0.15 mrad to 0.3 mrad, for example, 0.25 mrad.

It goes without saying that in the embodiments in which the colored thermoplastic intermediate layer has a first colored thermoplastic layer with a wedge-shaped cross-section and a second colored thermoplastic layer with a wedge-shaped cross-section, the layers with a wedge-shaped cross-section are arranged such that, in each case, the thinner ends are positioned one above another and, in each case, the thicker ends are positioned one above another, i.e., the increase in thickness of the two layers runs in the same direction.

The invention also relates to a composite pane, comprising an outer pane and an inner pane that are joined to one another via a colored thermoplastic intermediate layer according to the invention.

The colored thermoplastic intermediate layer according to the invention has, as described above, a wedge-shaped cross-section and can be formed as in the various embodiments described above.

The composite pane according to the invention has an upper edge and a lower edge. "Upper edge" refers to that side edge of the composite pane that is intended to point upward in the installed position. "Lower edge" refers to that side edge that is intended to point downward in the installed position. If the composite pane is the windshield of a motor vehicle, the upper edge is often also referred to as the "roof edge"; and the lower edge, as the "engine edge".

The outer pane and the inner pane have in each case an exterior-side surface and an interior-side surface and a circumferential side edge running therebetween. In the context of the invention, "exterior-side surface" refers to that primary surface that is intended, in the installed position, to face the external environment. In the context of the invention, "interior-side surface" refers to that primary surface that is intended, in the installed position, to face the interior. The interior-side surface of the outer pane and the exterior-side surface of the inner pane face each other and are joined to one another by the colored thermoplastic intermediate layer according to the invention.

In the case of a vehicle pane, "inner pane" refers to that pane which is intended to face the interior of the vehicle in the installed position. "Outer pane" refers to that pane which is intended to face the external environment of the vehicle in the installed position.

The outer pane and the inner pane have a substantially constant cross-section.

However, it is also possible for the outer pane and/or the inner pane to have a wedge-shaped cross-section. The wedge angle of such a pane with a wedge-shaped cross-section is preferably 0.05 mrad to 0.5 mrad, particularly preferably 0.15 mrad to 0.3 mrad, for example, 0.25 mrad.

In the present application, a "substantially constant cross-section of a pane" means that the thickness of the pane is constant over the height and width within normal manufacturing tolerances. Preferably, this means that the thickness varies by no more than 7%, preferably by no more than 5%, particularly preferably by no more than 3%.

Since the composite pane according to the invention includes a multilayer colored thermoplastic intermediate layer according to the invention with a wedge-shaped cross-section and two panes having a substantially constant thickness or with a wedge-shaped cross-section, the composite pane according to the invention has a wedge-shaped cross-section.

It goes without saying that "cross-section" means the cross-section in vertical progression between the lower edge and the upper edge. In the composite panes according to the invention, the thickness increases from the lower edge to the upper edge. The thicker first end is thus situated at the upper edge and the thinner second end at the lower edge of the composite pane. This applies equally to the colored thermoplastic intermediate layer according to the invention with a wedge-shaped cross-section and the wedge-shaped layer or wedge-shaped layers that the colored thermoplastic intermediate layer according to the invention has, as described above in the various embodiments.

In vehicle construction, the thickness is typically varied such that the smallest thickness is provided at the lower end of the composite glass pane toward the engine compartment with the thickness increasing toward the roof.

The wedge angle of the composite pane according to the invention is preferably 0.1 mrad to 1.0 mrad, particularly preferably 0.3 mrad to 0.6 mrad, for example, 0.5 mrad.

The composite pane according to the invention can include one or more additional intermediate layers, in particular functional intermediate layers, with these additional intermediate layers being of substantially constant thickness. In other words, the one or more additional intermediate layers have no wedge angle.

This at least one additional intermediate layer is arranged between the outer pane and the colored thermoplastic intermediate layer or between the inner pane and the colored thermoplastic intermediate layer. If the composite pane according to the invention has two or more additional intermediate layers, it is also possible for at least one of the additional intermediate layers to be arranged between the outer pane and the colored thermoplastic intermediate layer and for at least one of the additional intermediate layer to be arranged between the inner pane and the colored thermoplastic intermediate layer.

An additional intermediate layer can be, in particular, an intermediate layer, an infrared-radiation-absorbing layer, an infrared radiation-reflecting element, an ultraviolet radiation-absorbing layer, a barrier layer, or a combination of these. In the event of the presence of a plurality of additional intermediate layers, these can also have different functions.

The additional intermediate layer can also be implemented as a functional intermediate layer with acoustically damping properties. It goes without saying that the additional intermediate layer is preferably implemented as a functional intermediate layer with acoustically damping properties when the colored thermoplastic intermediate layer according to the invention is not already implemented as a functional intermediate layer with acoustically damping properties.

The outer pane and the inner pane are preferably made of glass, particularly preferably of soda lime glass, as is customary for window panes. However, the panes can also be made of other types of glass, for example, quartz glass, borosilicate glass, or aluminosilicate glass, or of rigid clear plastics, for example, polycarbonate or polymethyl methacrylate.

The outer pane and/or the inner pane can have antireflection coatings, non-stick coatings, anti-scratch coatings, photocatalytic coatings, electrically heatable coatings, solar protection coatings, and/or low-E coatings.

The thickness of the outer pane and the inner pane can vary widely and thus be adapted to the requirements in the individual case. The outer pane and the inner pane preferably have thicknesses of 1 mm to 5 mm, particularly preferably of 1 mm to 3 mm. For example, the outer pane is 2.1 mm thick at the thicker first end, and the inner pane is 1.6 mm thick. However, the outer pane or, in particular, the inner pane, can also be thin glass with a thickness of, for example, 0.55 mm.

The thickness of the colored thermoplastic intermediate layer according to the invention is, for example, 0.76 mm to 0.84 mm at the thicker first end, and, for example, at least 0.55 mm, preferably at least 0.65 mm, at the thinner second end, with the proviso that the thickness at the thinner second end be less than the thickness at the thicker first end.

As described above, the outer pane and/or the inner pane can also have a wedge-shaped cross-section. In this case, the thickness is preferably 1 mm to 5 mm at the thinner end.

The height of the outer pane and the inner pane, in other words, in the case of a windshield, the distance between the roof edge of the composite pane and the engine edge of the composite pane is preferably between 0.8 m and 1.40 m, particularly preferably between 0.9 m and 1.25 m, for example, 1.0 m. It goes without saying that the height of the colored thermoplastic intermediate layer according to the invention and the optional additional intermediate layers is thus also preferably between 0.8 m and 1.40 m, particularly preferably between 0.9 m and 1.25 m, for example, 1.0 m.

Thus, in the context of the invention, the height of the colored thermoplastic intermediate layer according to the invention means the measure of the dimension along the direction in which the colored thermoplastic intermediate layer according to the invention extends, for example, when the composite pane is installed as a windshield in the installed position between the roof edge and the engine edge. Accordingly, in the context of the invention, the height of the first colored thermoplastic layer, the second thermoplastic layer, and the acoustically damping layer also means, in each case, the measure of the dimension in the direction along which the respective layer extends when the composite pane is installed as a windshield in the installed position between the roof edge and the engine edge.

The composite pane according to the invention can be a vehicle pane. A vehicle pane is intended for separating a vehicle interior from an external environment. A vehicle pane is thus a window pane that is or is intended to be inserted into a window opening of the vehicle body. A composite pane according to the invention is, in particular, a windshield of a motor vehicle.

The outer pane and the inner pane can be, independently of one another, clear and colorless, but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The outer pane and the inner pane can be made, for example, of non-tempered, partially tempered, or tempered glass.

In the case of composite panes intended as windshields, the coloring is such that the composite pane has light transmittance greater than 70% in the spectral range from 380 nm to 780 nm. In the case of composite panes intended as roof panels or rear side windows, the coloring or tinting can also be darker, and the composite panes can thus have light transmittance of 70% or less in the spectral range from 380 nm to 780 nm.

A composite pane according to the invention can, additionally, include a masking print, made in particular from a dark, preferably black, enamel. The masking print is, in particular, a peripheral, i.e., frame-like, masking print. The peripheral masking print serves primarily as UV protection for the mounting adhesive of the composite pane. The masking print can be opaque and cover the entire surface. The masking print can also be designed, at least in sections, semitransparent, for example, as a point grid, strip grid, or checkered grid. Alternatively, the masking print can also have a gradient, for example, from an opaque covering to a semitransparent covering. The masking print is customarily applied on the interior-side surface of the outer pane or on the interior-side surface of the inner pane.

The composite pane according to the invention is preferably curved in one or a plurality of spatial directions, as is customary for motor vehicle windows, with typical radii of curvature in the range from approx. 10 cm to approx. 40 m. The composite glass can, however, also be flat, for example, when it is provided as a pane for buses, trains, or tractors.

The composite pane according to the invention can be used, for example, as a head-up display (HUD) for displaying information.

The invention also relates to a projection arrangement for a head-up display (HUD) at least comprising a composite pane according to the invention and a projector. As usual with HUDs, the projector illuminates a region of the windshield where the light is reflected in the direction of the viewer (driver), creating a virtual image that the viewer perceives as behind the windshield from his point of view. The region of the windshield that can be illuminated by the projector is referred to as the "HUD region". The direction of illumination of the projector can typically be varied by mirrors, in particular vertically, in order to adapt the projection to the body size of the viewer. The region in which the eyes of the viewer must be situated with a given mirror position is referred to as the "eye box window". This eye box window can be shifted vertically by adjustment of the mirrors, with the entire area thus available (i.e., the overlay of all possible eye box windows) referred to as the "eye box". A viewer situated within the eye box can perceive the virtual image. This, of course, means that the eyes of the viewer must be situated within the eye box not, for example, the entire body.

The technical terms from the field of HUDs used here are generally known to the person skilled in the art. For a detailed presentation, reference is made to the dissertation "Simulation-Based Metrology for Testing Head-Up Displays" by Alexander Neumann at the Informatics Institute of Munich Technical University (Munich: University Library of Munich TU, 2012), in particular to chapter 2 "The Head-Up Display".

The above-described preferred embodiments of the colored thermoplastic intermediate layer according to the invention also apply mutatis mutandis to the composite pane according to the invention comprising a colored thermoplastic intermediate layer according to the invention and also to the projection arrangement comprising a composite pane according to the invention and a projector.

The invention also relates to a method for producing a colored thermoplastic intermediate layer according to the invention, wherein the method comprises at least the step of extruding a first colored thermoplastic layer.

Thus, the invention also relates to a method for producing a colored thermoplastic intermediate layer according to the invention with a width, a height, and a wedge-shaped cross-section with a thicker first end and a thinner second end, at least comprising a first colored thermoplastic layer with a width, a height, and a wedge-shaped cross-section with a thicker first end and a thinner second end, wherein the width and the height of the colored thermoplastic intermediate layer equal the width and the height of the first colored thermoplastic layer, the first colored thermoplastic layer has a dye, the dye concentration in the first colored thermoplastic layer increases from its thicker first end to its thinner second end, the light transmittance through the first colored thermoplastic layer is constant over its entire width and its entire height, and the light transmittance through the colored thermoplastic intermediate layer is constant over its entire width and its entire height, wherein the method comprises at least the step of extruding the first colored thermoplastic layer.

The extrusion is usually carried out at temperatures between 150° C. and 200° C.

In one embodiment, the method comprises the extrusion of a first colored thermoplastic layer, the extrusion of an acoustically damping layer, and the extrusion of a second colored thermoplastic layer by co-extrusion.

The layers are extruded such that the acoustically damping layer is arranged between the first dye-colored thermoplastic layer and the second dye-colored thermoplastic layer. Two extruders are required for this embodiment of the method: one extruder for the first colored thermoplastic layer and the second colored thermoplastic layer, and one extruder for the acoustically damping layer. The two extruders are connected to a three-slot die. The dye and its concentration in the first dye-colored thermoplastic layer and the dye and its concentration in the second dye-colored thermoplastic layer must, in particular, be selected such that the resulting color and the light transmittance of the colored thermoplastic intermediate layer meet the respective desired requirements.

In one embodiment of this method, the acoustically damping layer is colorless; in an alternative embodiment, the acoustically damping layer is colored with a dye. In the embodiment in which the acoustically damping layer is colored with a dye, the dye and its concentration in the dye-colored acoustically damping layer, the dye and its concentration in the dye-colored first thermoplastic layer, and the dye and its concentration in the dye-colored second thermoplastic layer must, in particular, be selected such that the resulting color and the light transmittance of the colored thermoplastic intermediate layer meet the respective desired requirements.

In a preferred embodiment, the method according to the invention includes an additional step in which indentations are embossed in at least one of the surfaces, preferably in both surfaces, of the colored thermoplastic intermediate layer. By means of the embossed indentations, a surface roughness Rz of 10 µm to 75 µm, preferably of 25 µm to 75 µm, particularly preferably of 35 µm to 65 µm, for example, 50 µm, can be achieved.

Methods for embossing indentations are disclosed, for example, in the publications U.S. Pat. Nos. 5,455,103, 6,863,956 B1, and 7,883,761 B2.

Alternatively, a surface roughness Rz of 15 µm to 45 µm, for example, 30 µm in the colored thermoplastic intermediate layer can also be achieved by the method of melt fracturing known to the person skilled in the art.

Due to the embossed indentations, better deaeration is achieved during the lamination of an outer pane and an inner pane by means of the colored thermoplastic intermediate layer.

The invention also relates to a method for producing a colored composite pane for a head-up display (HUD), wherein the composite pane has an outer pane, an inner pane, and a colored thermoplastic intermediate layer with a wedge-shaped cross-section arranged between the outer pane and the inner pane, and wherein in the method at least:

(a) an outer pane and an inner pane are provided;
(b) a colored thermoplastic intermediate layer with a wedge-shaped cross-section according to the invention is provided,
(c) the colored thermoplastic intermediate layer is arranged in a planar manner between the outer pane and the inner pane; and
d) the outer pane, the colored thermoplastic intermediate layer, and the inner pane are joined by lamination.

The colored thermoplastic intermediate layer according to the invention can be provided as described above by an extrusion process. The colored thermoplastic intermediate layer is the above-described colored thermoplastic intermediate layer according to the invention.

The method can additionally include the steps of providing at least one additional intermediate layer and the arrangement thereof independent of one another between the outer pane and the colored thermoplastic intermediate layer or between the inner pane and the colored thermoplastic intermediate layer. The at least one additional intermediate layer has substantially constant thickness. When an additional intermediate layer is provided, it can thus be arranged between the outer pane and the colored thermoplastic intermediate layer or between the inner pane and the colored thermoplastic intermediate layer. When more than one additional intermediate layer is provided, they can thus be arranged either between the outer pane and the colored thermoplastic intermediate layer or between the inner pane and the colored thermoplastic intermediate layer; or additional intermediate layers can be arranged both between the outer pane and the colored thermoplastic intermediate layer and also between the inner pane and the colored thermoplastic intermediate layer.

The at least one additional intermediate layer is preferably a functional intermediate layer, in particular an IR-reflecting layer, a UV-radiation-absorbing layer, a barrier layer, an intermediate layer with acoustically damping properties, or a combination of these. When there are multiple additional intermediate layers, they can also have different functions.

In the at least one additional intermediate layer, indentations can also be embossed in at least one surface or roughness can be obtained by melt fracturing.

If the composite pane is to be bent, the outer pane and the inner pane are preferably subjected to a bending process before lamination. Preferably, the outer pane and the inner pane are bent congruently together (i.e., at the same time and with the same tool), because the shape of the panes is thus optimally matched for the subsequent lamination. Typical temperatures for glass bending processes are, for example, 500° C. to 700° C.

The above-described preferred embodiments of the colored thermoplastic intermediate layer according to the invention or the composite pane according to the invention also apply mutatis mutandis to methods for producing a colored thermoplastic intermediate layer according to the invention or for producing a composite pane according to the invention.

The invention also relates to the use of a colored thermoplastic intermediate layer according to the invention in a composite pane, in particular in a vehicle pane in means of locomotion for travel on land, in the air, or on water, in particular in motor vehicles and most particularly in a windshield in a motor vehicle.

The invention also relates to the use of a composite pane according to the invention as a vehicle pane in means of locomotion for travel on land, in the air, or on water, in particular in motor vehicles and in particular in a windshield in a motor vehicle.

In the following, the invention is explained in detail with reference to drawings and exemplary embodiments. The drawings are schematic representations and not to scale. The drawings in no way restrict the invention.

They depict:

FIG. 1 the cross-section of one embodiment of a colored thermoplastic intermediate layer according to the invention;

FIG. 2 the cross-section of another embodiment of a colored thermoplastic intermediate layer according to the invention;

FIG. 3 the cross-section of another embodiment of a colored thermoplastic intermediate layer according to the invention;

FIG. 4 the cross-section of another embodiment of a colored thermoplastic intermediate layer according to the invention;

FIG. 5 the cross-section of another embodiment of a colored thermoplastic intermediate layer according to the invention;

FIG. 6 the cross-section of one embodiment of a composite pane according to the invention;

FIG. 7 the cross-section of another embodiment of a composite pane according to the invention;

FIG. 8 the cross-section of one embodiment of a projection arrangement according to the invention, and FIG. 9 a detail of the cross-section depicted in FIG. 1 of one embodiment of a colored thermoplastic intermediate layer according to the invention.

FIG. 1 depicts the cross-section of one embodiment of a colored thermoplastic intermediate layer 1 according to the invention. The colored thermoplastic intermediate layer 1 has a wedge-shaped cross-section and thus a thicker first end and a thinner second end. In the embodiment depicted in FIG. 1, the increase in thickness from the second end to the first end of the colored thermoplastic intermediate layer 1 is continuously linear.

In the embodiment depicted in FIG. 1, the colored thermoplastic intermediate layer 1 has a wedge angle of 0.5 mrad. In the embodiment depicted in FIG. 1, the colored thermoplastic intermediate layer 1 is, for example, 0.76 mm thick at its thinner second end and 1.26 mm thick at its thicker first end. It is not further specified in FIG. 1 whether the colored thermoplastic intermediate layer 1 is formed from only one film is or formed from multiple films.

As described above, a colored thermoplastic intermediate layer 1 according to the invention has a width, a height, and a wedge-shaped cross-section. FIG. 1 depicts the cross-section along the height of the colored thermoplastic intermediate layer 1 according to the invention. The distance between the thinner second end and the thicker first end of the colored thermoplastic intermediate layer 1 according to the invention is the height of the thermoplastic intermediate layer 1 according to the invention.

The light transmittance through the colored thermoplastic intermediate layer 1 is constant over its entire width and its entire height.

Figure 4:
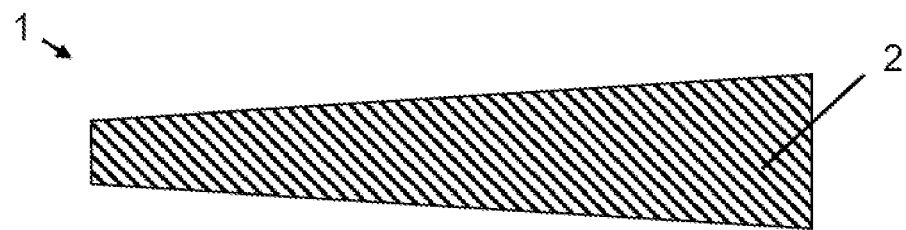

FIG. 4 depicts another embodiment of a colored thermoplastic intermediate layer 1 according to the invention. This is an embodiment of the colored thermoplastic intermediate layer 1 depicted in FIG. 1. In this embodiment, the colored thermoplastic intermediate layer 1 comprises a first colored thermoplastic layer 2, containing, for example, PVB and a dye in the form of an organic ink. The first colored thermoplastic layer 2 and thus the colored thermoplastic intermediate layer 1 is, for example, colored green in the embodiment depicted in FIG. 4. However, in principle, any other color is also possible, with typical colors for the automobile market being green, blue, and gray.

The width and the height of the colored thermoplastic intermediate layer 1 equal the width and the height of the first colored thermoplastic layer 2. The wedge-shaped thickness profile of the colored thermoplastic intermediate layer 1 also equals the thickness profile of the first colored thermoplastic layer 2. The dye concentration in the first colored thermoplastic layer 2 increases from its thicker first end to its thinner second end. The light transmittance through the first colored thermoplastic layer 2 is constant over its entire width and its entire height, and thus the light transmittance through the colored thermoplastic intermediate layer 1 is also constant over its entire width and its entire height.

Figure 5:
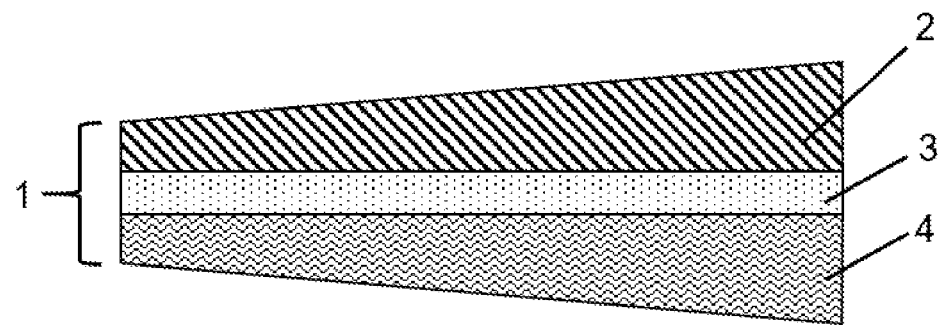

FIG. 5 depicts another embodiment of a colored thermoplastic intermediate layer 1 according to the invention. This is another embodiment of the colored thermoplastic intermediate layer 1 depicted FIG. 1.

This is characterized in that the colored thermoplastic intermediate layer 1 includes, in addition to a first colored thermoplastic layer 2, a second colored thermoplastic layer 4 as well as an acoustically damping layer 3, with the acoustically damping layer 3 arranged between the first colored thermoplastic layer 2 and the second colored thermoplastic layer 4. The first colored thermoplastic layer 2 and the second colored thermoplastic layer 4 have a in each case a wedge-shaped cross-section and thus a thicker first end and a thinner second end and are, for example, 0.33 mm thick at the thinner second end in each case and have a wedge angle of 0.25 mrad in each case. The acoustically damping layer 3 has no wedge angle and has a constant thickness of, for example, 100 µm. In the embodiment depicted in FIG. 5, the acoustically damping layer 3 is colorless; however, it can, alternatively, also be colored. In the embodiment depicted in FIG. 5, the first colored thermoplastic layer 2 and the second colored thermoplastic layer 4 contain, for example, PVB and a dye in the form of inorganic pigments.

The first colored thermoplastic layer 2 and the second colored thermoplastic layer 4 and thus the colored thermoplastic intermediate layer 1 are, for example, colored gray in the embodiment depicted in FIG. 5. However, in principle, any other color is also possible, with typical colors for the automotive market being green, blue, and gray.

The first colored thermoplastic layer 2, the second colored thermoplastic layer 4, and the acoustically damping layer 3 positioned therebetween are arranged one above another over their entire surface and have the same width and height. Due to the wedge-shaped cross-section of the colored thermoplastic intermediate layer 1, the thickness of the colored thermoplastic intermediate layer 1 according to the invention depicted in cross-section in FIG. 5 is not constant and equals, in each case, the sum of the thicknesses of the first colored thermoplastic layer 2, the second colored thermoplastic layer 4, and the acoustically damping layer 3 positioned therebetween.

The dye concentration in the first colored thermoplastic layer 2 increases from its thicker first end to its thinner second end. The dye concentration in the second colored thermoplastic layer 4 also increases from its thicker first end to its thinner second end. The light transmittance through the first colored thermoplastic layer 2 is constant over its entire width and its entire height; the light transmittance through the second colored thermoplastic layer 4 is also constant over its entire width and its entire height, and thus the light transmittance through the colored thermoplastic intermediate layer 1 is also constant over its entire width and its entire height.

Figure 6:
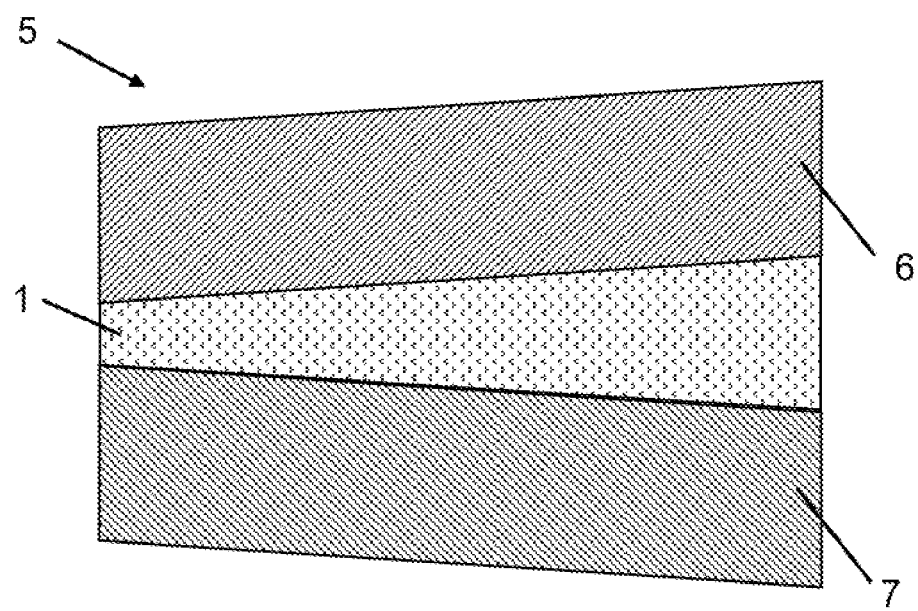

FIG. 6 depicts the cross-section of one embodiment of a composite pane 5 according to the invention. This comprises an outer pane 6 and an inner pane 7 that are joined to one another via a colored thermoplastic intermediate layer 1 according to the invention. The colored thermoplastic intermediate layer 1 can be constructed, for example, as in FIGS. 4 and 5. In the embodiment depicted in FIG. 6, the outer pane 6 and the inner pane 7 are made, for example, of soda lime glass and have a thickness of 2.1 mm in each case. However, it is also possible for the outer pane 6 and the inner pane 7 to have different thicknesses. In the embodiment depicted in FIG. 6, the outer pane 6 and the inner pane 7 have no wedge angle. However, it is also possible for the outer pane 6 and/or the inner pane 7 to have a wedge angle, i.e., to have a wedge-shaped cross-section.

Figure 7:
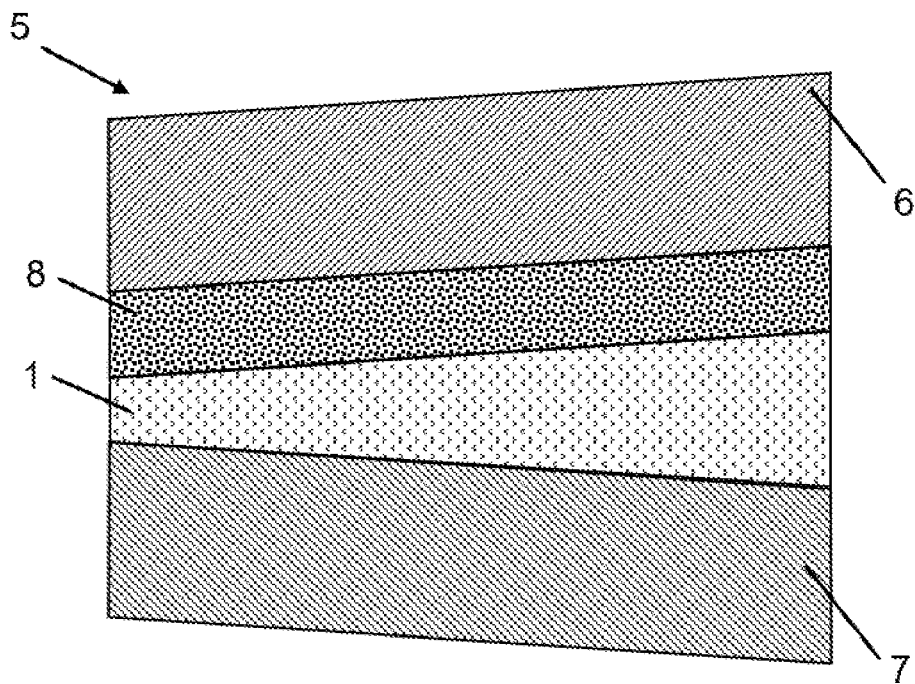

FIG. 7 depicts the cross-section of another embodiment of a composite pane 5 according to the invention. The embodiment of a composite pane 5 according to the invention depicted in cross-section in FIG. 7 differs from the embodiment depicted in FIG. 6 only in that the composite pane 5 has an additional intermediate layer 8 that is arranged between the outer pane 6 and the colored thermoplastic intermediate layer 1.

It goes without saying that the additional intermediate layer 8 can, alternatively, also be arranged between the inner pane 7 and the colored thermoplastic intermediate layer 1 or, if there are at least two additional intermediate layers 8, at least one can also be arranged between the outer pane 6 and the colored thermoplastic intermediate layer 1 and at least one can be arranged between the inner pane 7 and the colored thermoplastic intermediate layer 1.

In the embodiment depicted in FIG. 7, the additional intermediate layer 8 is, for example, an infrared-radiation-reflecting layer with a constant thickness of 0.38 mm.

Figure 8:
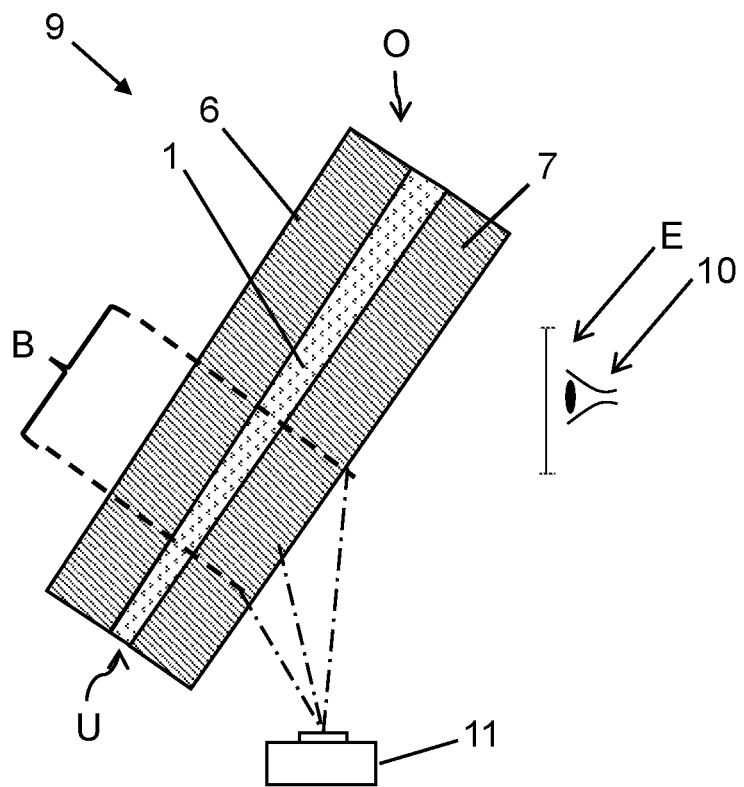

FIG. 8 depicts the cross-section of a projection arrangement 9 according to the invention. The projection arrangement 9 comprises a composite pane 5, in particular the windshield of a passenger car, with an upper edge O and a lower edge U and two side edges not shown in FIG. 8. In the projection arrangement 9 depicted in FIG. 8, the composite pane 5 corresponds to the composite pane 5 depicted in FIG. 6. The projection arrangement 9 further comprises a projector 11, which is aimed at a region B of the composite pane 5. In the region B, which is commonly referred to as the HUD region, images can be generated by the projector 11, which are perceived by a viewer 10 (vehicle driver) as virtual images on the side of the composite pane 5 facing away from him, when his eyes are situated within the so-called eye box E.

Figure 1:
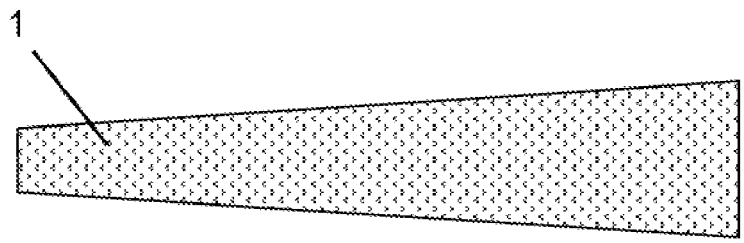
Figure 2:
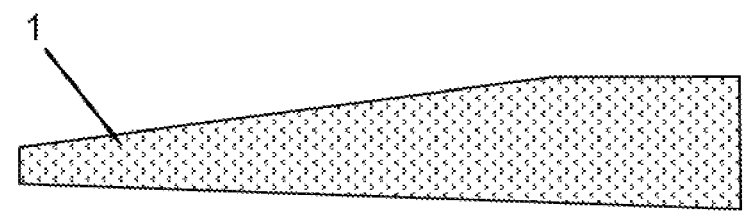
FIG. 2 depicts another embodiment of a colored thermoplastic intermediate layer 1 according to the invention in cross-section. The embodiment depicted in FIG. 2 differs from that depicted in FIG. 1 only in that the colored thermoplastic intermediate layer 1 has a plateau at the thicker first end in cross-section.
Figure 3:
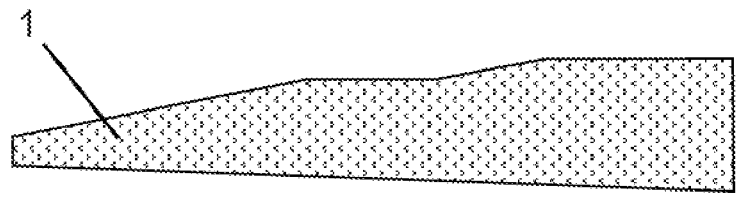
FIG. 3 depicts another embodiment of a colored thermoplastic intermediate layer 1 according to the invention in cross-section. The embodiment depicted in FIG. 3 differs from that depicted in FIG. 1 only in that in the case of the multilayer colored thermoplastic intermediate layer 1, the wedge angle varies in the progression from the thinner second end to the thicker first end.
Figure 9:
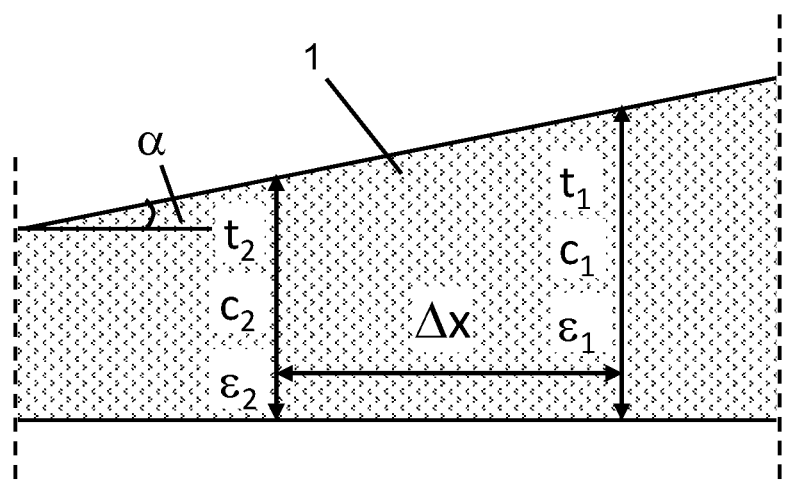

FIG. 9 depicts a detail of the cross-section depicted in FIG. 1 of one embodiment of a colored thermoplastic intermediate layer 1 according to the invention. In this detail, the measurement points are drawn in, that are required for the following formula to calculate the ratio of the dye concentrations at positions in the layer with different thicknesses, which is needed in order to achieve constant light transmittance at both positions:

$$\frac{c_1}{c_2} = \left(1 - \frac{\Delta x}{t_1} \cdot \tan\alpha\right) \cdot \frac{\varepsilon_2}{\varepsilon_1}$$

where:
$t_1$: thickness at position 1
$t_2$: thickness at position 2
$c_1$: concentration at position 1
$c_2$: concentration at position 2
$\varepsilon_1$: extinction coefficient at position 1
$\varepsilon_2$: extinction coefficient at position 2
$\alpha$: wedge angle
$\Delta x$: distance between position 1 and position 2.

LIST OF REFERENCE CHARACTERS 1 colored thermoplastic intermediate layer
2 first colored thermoplastic layer
3 acoustically damping layer
4 second colored thermoplastic layer
5 composite pane
6 outer pane
7 inner pane
8 additional intermediate layer
9 projection arrangement
10 viewer, vehicle driver
11 projector
B HUD region of the composite pane 5
E eye box, eye box window
O upper pane edge/upper edge/roof edge of the composite pane
U lower pane edge/lower edge/engine edge of the composite pane
$t_1$ thickness at position 1
$t_2$ thickness at position 2
$c_1$ concentration at position 1
$c_2$ concentration at position 2
$\varepsilon_1$ extinction coefficient at position 1
$\varepsilon_2$ extinction coefficient at position 2
$\alpha$ wedge angle
$\Delta x$ distance between position 1 and position 2

The invention claimed is:
1. A colored thermoplastic intermediate layer with a width, a height, and a wedge-shaped cross-section with a thicker first end and a thinner second end, at least comprising a first colored thermoplastic layer with a width, a height, and a wedge-shaped cross-section with a thicker first end and a thinner second end,
wherein
the width and the height of the colored thermoplastic intermediate layer equal the width and the height of the first colored thermoplastic layer,
the first colored thermoplastic layer has a dye,
a dye concentration in the first colored thermoplastic layer increases from its thicker first end to its thinner second end,
a light transmittance through the first colored thermoplastic layer is constant over its entire width and its entire height, and a light transmittance through the colored thermoplastic intermediate layer is constant over its entire width and its entire height.

2. The colored thermoplastic intermediate layer according to claim 1, wherein the colored thermoplastic intermediate layer has a wedge angle in the range from 0.1 mrad to 1.0 mrad.

3. The colored thermoplastic intermediate layer according to claim 2, wherein the wedge angle is in the range from 0.3 mrad to 0.6 mrad.

4. The colored thermoplastic intermediate layer according to claim 1, wherein the first colored thermoplastic layer contains a dye and at least polyvinyl butyral (PVB), ethylene vinyl acetate (EVA), polyurethane (PU), or mixtures or copolymers or derivatives thereof.

5. The colored thermoplastic intermediate layer according to claim 4, wherein the first colored thermoplastic layer contains a dye and polyvinyl butyral (PVB), and plasticizer.

6. The colored thermoplastic intermediate layer according to claim 1, wherein a color of the colored thermoplastic intermediate layer measured by the coordinates $L^*$, $a^*$, and $B^*$ per CIELab is substantially constant over its width and height.

7. The colored thermoplastic intermediate layer according to claim 1, additionally comprising
an acoustically damping layer having a substantially constant thickness and a width and a height, and
a second colored thermoplastic layer having a width, a height, and a wedge-shaped cross-section with a thicker first end and a thinner second end,
wherein
the width and the height of the acoustically damping layer and the width and the height of the second colored thermoplastic layer are equal to the width and the height of the colored thermoplastic intermediate layer and to the width and the height of the first colored thermoplastic layer, respectively,
the acoustically damping layer is arranged in a planar manner between the first colored thermoplastic layer and the second colored thermoplastic layer and is colorless or colored with a dye,
the second colored thermoplastic layer has a dye,
a dye concentration in the second colored thermoplastic layer increases from its thicker first end to its thinner second end, and
a light transmittance through the second colored thermoplastic layer is constant over its entire width and its entire height.

8. The colored thermoplastic intermediate layer according to claim 7, wherein the acoustically damping layer is colorless.

9. The colored thermoplastic intermediate layer according to claim 7, wherein the acoustically damping layer is colored with a dye.

10. A composite pane, comprising an outer pane, an inner pane, and a colored thermoplastic intermediate layer according to claim 1 arranged between the outer pane and the inner pane.

11. The composite pane according to claim 10, additionally comprising at least one additional intermediate layer, which is arranged between the outer pane and the colored thermoplastic intermediate layer or between the inner pane and the colored thermoplastic intermediate layer and has a substantially constant thickness.

12. The composite pane according to claim 11, wherein the at least one additional intermediate layer is an infrared-radiation-absorbing layer, an infrared-radiation-reflecting layer, a UV-radiation-absorbing layer, a barrier layer, an intermediate layer with acoustically damping properties, or a combination of these.

13. The composite pane according to claim 10, wherein the outer pane and/or the inner pane has antireflection coatings, non-stick coatings, anti-scratch coatings, photocatalytic coatings, electrically heatable coatings, solar protection coatings, and/or low-E coatings.

14. The composite pane according to claim 10, wherein the composite pane is a vehicle pane.

15. The composite pane according to claim 14, wherein the vehicle pane is a windshield for a motor vehicle.

16. A projection arrangement for a head-up display (HUD) for displaying information for a viewer in an HUD region, comprising:
a composite pane according to claim 1, and
a projector aimed at the HUD region.

17. A method for producing a colored thermoplastic intermediate layer according to claim 1, comprising extrusion of a first colored thermoplastic layer.

18. A method for producing a colored thermoplastic intermediate layer according to claim 7, comprising extrusion of a first colored thermoplastic layer, extrusion of an acoustically damping layer, and extrusion of a second colored thermoplastic layer by means of co-extrusion.

19. A method comprising providing a colored thermoplastic intermediate layer according to claim 1 in a vehicle pane in a vehicle of locomotion for travel on land, in the air, or on water.

20. The method according to claim 19, wherein the vehicle pane is a windshield that is used as a projection surface of a projection arrangement for a head-up display.

* * * * *